United States Patent [19]

Castrantas et al.

[11] 4,430,454
[45] Feb. 7, 1984

[54] POLYMERIC FOAM DERIVED FROM POLYMALEIC ANHYDRIDE AND ITS PREPARATION

[75] Inventors: Harry M. Castrantas, Newtown, Pa.; Sidney Berkowitz, Highland Park, N.J.

[73] Assignee: FMC Corporation, Philadelphia, Pa.

[21] Appl. No.: 493,110

[22] Filed: May 9, 1983

[51] Int. Cl.$^3$ .................... C08G 18/14; C08G 18/62; C08G 18/16; C08G 18/67

[52] U.S. Cl. .................... 521/107; 521/123; 521/128; 521/131; 521/149; 521/156; 521/157

[58] Field of Search ............ 521/156, 157, 123, 107, 521/131, 128, 149

[56] References Cited

U.S. PATENT DOCUMENTS

| | | | |
|---|---|---|---|
| 3,359,246 | 12/1967 | Berry | 526/227 |
| 3,374,209 | 3/1968 | Hay et al. | 525/327.7 |
| 3,383,351 | 5/1968 | Stamberger | 521/157 |
| 3,523,093 | 8/1970 | Stamberger | 521/157 |
| 3,620,987 | 11/1971 | McLaughlin et al. | 521/156 |
| 3,620,990 | 11/1971 | Hazen et al. | 260/2.5 R |
| 3,833,523 | 9/1974 | Tariel et al. | 521/157 |
| 3,887,526 | 6/1975 | Lancelot et al. | 526/68 |
| 4,198,488 | 4/1980 | Drake et al. | 521/137 |
| 4,278,627 | 7/1981 | Kajimura et al. | 264/45.4 |

FOREIGN PATENT DOCUMENTS 1811166  6/1970  Fed. Rep. of Germany .

Primary Examiner—H. S. Cockeram
Attorney, Agent, or Firm—Christopher Egolf

[57] ABSTRACT

Polymeric foam compositions, useful as insulating material are obtained from the reaction of polymaleic anhydride with a hydroxyl-containing compound like ethylene glycol or its derivatives, in the presence of an organic isocyanate. Hydroxyl-containing compounds suitable for reaction with polymaleic anhydride include $C_2$–$C_{10}$ diols, $C_3$–$C_6$ trilos, $C_4$–$C_5$ tetraols and their derivatives.

46 Claims, No Drawings

POLYMERIC FOAM DERIVED FROM POLYMALEIC ANHYDRIDE AND ITS PREPARATION

BACKGROUND OF THE INVENTION

1. Field of the Invention

The invention relates to a polymeric foam and, more particularly, to a foam composition obtained from the reaction of polymaleic anhydride with certain polyols or their derivatives and a process for preparing the same.

2. Description of the Prior Art

Polymeric foams that are prepared by chemical stabilization, i.e., polymerization of a resin system into a thermoset, foamed polymer, are well known. Polyurethane foams, derived from the reaction of a polyfunctional isocyanate and a hydroxyl-containing polymer, are the most important commercial foam within this category.

Rigid polymeric foams are used primarily for thermal insulation, with one major application being ceiling and wall insulation in residential buildings. Such rigid polymeric foams are typically evaluated in the marketplace on the basis of their insulating performance measured against alternative insulating systems (fiberglass, glass wool, polystyrene), so performance-cost is a critically important factor. Polymeric foam systems that perform as well as rigid polyurethane foam but whose economics are more attractive are therefore highly desirable.

The present invention provides a polymeric foam composition, derived from polymaleic anhydride, which possesses performance characteristics similar to that of polyurethane yet can be prepared from less costly reactants.

SUMMARY OF THE INVENTION

In accordance with the present invention, a polymeric foam composition is provided that is the product of polymaleic anhydride reacted with a hydroxyl-containing compound selected from $C_2$–$C_{10}$ diols, $C_3$–$C_6$ triols, $C_4$–$C_5$ tetraols and their derivatives, in the presence of an organic isocyanate. The present invention also encompasses the process by which this polymeric foam composition is prepared.

The polymaleic anhydride utilized in the polymeric foam is a homopolymer, preferably having an average molecular weight of from about 1500 to 5000.

The hydroxyl-containing compound is preferably selected from $C_2$–$C_6$ alkyl diols, $C_4$–$C_6$ alkenyl diols and $C_6$ cycloalkyl diols; such preferred diols include ethylene glycol, propylene glycol, butanediol, butenediol, cyclohexanediol and xylene diol. A preferred diol derivative is polyethylene glycol, especially with an average molecular weight of from 350 to 4500. Glycerol is a preferred triol that is suitable for this invention.

A portion of the hydroxyl groups in the hydroxyl-containing compound may be epoxidized. Partially epoxidized compounds that are preferred include glycidol and its derivative, polyglycidol.

The organic isocyanate that is present during the reaction of this polymeric foam is preferably a diisocyanate and, further, is desirably present in an amount of not more than about 10 wt. %, based on weight of the foam primary reactants.

The reaction by which the polymeric foam is prepared is preferably effected at an elevated temperature, above 100° C. and most preferably, 110°–225° C. In the event the hydroxyl-containing compound is partially epoxidized, e.g., glycidol or polyglycidol, the reaction is preferably initiated at ambient temperature, about 10°–30° C. Blowing agents may be employed to provide more precise control of the foaming process. Flame retarding additives may also be incorporated into the polymeric foam.

DETAILED DESCRIPTION

The polymaleic anhydride employed in the polymeric foam of this invention is a homopolymer and should have an average molecular weight of at least 1000. Preferably, the average molecular weight of the polymaleic anhydride ranges from 1500–5000; and, most preferably from 2500–4000.

Polymaleic anhydride may be prepared for use in this invention by any of several well-known, conventional methods for homopolymerizing maleic anhydride, such as described in U.S. Pat. No. 3,359,246 issued to Berry and No. 3,887,526 issued to Lancelot et al.

Derivatives of polymaleic anhydride, such as substituted polymaleic anhydride having substituents in lieu of hydrogen on the maleic anhydride repeating unit, and even polymaleic acid, can be utilized in place of the preferred polymaleic anhydride, if so desired.

The hydroxyl-containing compounds suitable for reaction with the polymaleic anhydride include: $C_2$–$C_{10}$ diols: preferably, $C_2$–$C_6$ alkyl diols like ethylene glycol, propylene glycol, butanediol, etc.; $C_4$–$C_6$ alkenyl diols like butenediol, etc.;

and $C_6$ cycloalkyl diols like cyclohexanediol, etc.;

and other $C_2$–$C_{10}$ diols, such as xylenediol, decanediol, etc. $C_3$–$C_6$ triols: preferably, glycerol; and other triols like butanetriol, hexanetriol, etc. $C_4$–$C_5$ tetraols: erythritol, pentaerythritol, etc.

Among all the suitable hydroxyl-containing compounds, ethylene glycol is most preferred. The low molecular weight of ethylene glycol makes it especially suitable for preparing rigid polymeric foams.

Derivatives of the hydroxyl-containing compounds of the types described above are also suitable for reaction with polymaleic anhydride. Preferred derivatives of the diols and triols include their telomers, e.g., diethylene glycol, triethylene glycol, as well as their polymers, e.g., polyethylene glycol. A particularly preferred ethylene glycol derivative is polyethylene glycol having an average molecular weight of about 350 to 4500, and more preferably 400 to 1500.

The hydroxyl-containing compounds employed in this invention may also be partially epoxidized. Preferred derivatives of the hydroxyl-containing compounds within this category, i.e., having a portion but not all of the hydroxyl groups epoxidized, include glycidol and its derivative, polyglycidol, the latter desirably having an average molecular weight of from about 400 to 2000. One advantage of the partially epoxidized compounds is their ability to initiate reaction with polymaleic anhydride at ambient (10°–30° C.) temperature, the reaction occurring without resort to catalysts or input of heat.

The hydroxyl-containing compounds utilized in this invention may also be substituted with halogen or other radicals.

The reaction of polymaleic anhydride and the hydroxyl-containing compound (or its derivative) is carried out in the presence of an organic isocyanate. The organic isocyanate is preferably used in amounts of not more than 10 wt. %, more preferably, from 1–10 wt. %, and most preferably 2–6 wt. %, based on the total weight of the polymeric foam primary reactants, i.e., polymaleic anhydride and hydroxyl-containing compound.

Diisocyanates are preferred among the organic isocyanates suitable for use in this invention.

The organic isocyanate is desirably selected from the group consisting of 1,4-methylene diphenyl diisocyanate, toluene diisocyanate, hexamethylene diisocyanate, m-phenylene diisocyanate, tolidine diisocyanate, 4,4'-dicyclohexylmethane diisocyanate, and polymeric diphenylmethane diisocyanate. Polymeric diphenylmethane diisocyanate desirably has a functionality within the range 2.6–2.9 and an NCO equivalent weight of about 130.

The advantage provided by use of the organic isocyanates is that the resultant polymeric foams are greatly superior in hydrolytic stability to the corresponding foamed material made without isocyanate being present. Foamed material lacking the isocyanate tends to degrade or disintegrate when exposed to water, whereas the polymeric foam of this invention resists such deterioration.

In the reaction of polymaleic anhydride with the hydroxyl-containing compound, the relative amounts of these two reactants can be varied over a fairly wide range. The relative amounts of the two reactants may be varied, as desired, to modify foam physical properties, e.g. foam density, foam flexibility or rigidity, etc.

It is most preferred that the two reactants be employed in approximately stoichiometric equivalent molar amounts. A molar amount of polymaleic anhydride is its average molecular weight divided by the average number of maleic anhydride repeating units per molecule. Alternatively, a mole of polymaleic anhydride may be defined as the molecular weight of one maleic anhydride repeating unit (approximately 98) in the polymaleic anhydride polymer molecule. A molar amount of the hydroxyl-containing compound is defined as the molecular weight (or average molecular weight in the case of polymer mixtures) of such compound.

Satisfactory polymeric foams may be obtained with polymaleic anhydride:hydroxyl-compound molar ratios ranging from about 0.75:1 to 2.5:1, and preferably with molar ratios of from about 0.9:1 to 1.5:1.

Either rigid, semi-rigid or flexible polymeric foam compositions can be prepared. Cell structure, too, may be open cell or closed cell, the latter being desired for rigid foams. By way of illustration, with polymaleic anhydride/polyethylene glycol systems, more flexibility is obtained when the chain length (molecular weight) of the polyethylene glycol is increased. Rigid foams are generally preferred for applications in which the foam serves as an insulating material; ethylene glycol is highly preferred as the hydroxyl-containing reactant for preparing such rigid foams.

The reaction of polymaleic anhydride with the hydroxyl-containing compound, in the presence of the organic isocyanate, is a relatively straightforward reaction system. The polymaleic anhydride reactant is a solid, at room temperature, and typically the hydroxyl-containing compound is a liquid. It should be noted that polymeric derivatives of hydroxyl-containing compounds, e.g., polyethylene glycol, are often solids at ambient temperature. The two reactants may be blended, using conventional solid-liquid mixing techniques, along with the organic isocyanate. Solvents may optionally be employed for the reaction system.

Order of addition of the reactants in this invention is not critical. Typically the solid polymaleic anhydride is introduced to a reactor containing the hydroxyl-containing compound in a liquid state or in a solvent. The organic isocyanate may already be present in the reactor, or may be introduced at this time, or even may be introduced after the reaction between polymaleic anhydride and hydroxyl-containing compound has been initiated.

The reaction appears to be temperature controlled, with temperatures above 100° C. being preferred for initiation of the reaction and formation of foam with the desired characteristics. Temperatures of about 110°–225° C. are preferred, with 120°–150° C. being most preferred. Higher reaction temperatures appear to result in lowered foam density, which is a desired characteristic in rigid foams used for insulation purposes. Initiators or catalysts may also be used, if desired, to promote the reaction and/or permit the use of low reaction temperatures but are not required.

As noted previously, the use of a partially epoxidized hydroxyl-containing compound like glycidol has the advantage of allowing the use of low temperatures, e.g. about 10°–30° C., for initiating the reaction. The good, low-temperature reactivity of reaction systems utilizing partially epoxidized hydroxyl-containing compounds makes them especially suited for applications where foaming-in-place capability is desirable.

Reaction times may range from as short as a few minutes up to several hours; shorter reaction times of from 10–30 minutes are preferred.

The reaction may be carried out batchwise or continuously.

A preferred process for preparing the polymeric foams of this invention involves the use of blowing agents, to promote formation of a good, uniform cell structure in the foam.

Conventional techniques for employing blowing agents are readily utilized in this invention. It is well known in the polymeric foaming art that blowing agents may be employed to moderate the foaming reaction and to control the physical characteristics of the resultant foamed material, e.g. open vs. closed cell structure, density, mechanical properties like compressive strength, and the like.

Preferred blowing agents are low boiling point halocarbons that have low thermal conductivity, for enhancing the insulating properties of the resultant foam by virtue of the closed cells being filled with trapped blowing agent in a gaseous state.

Preferred blowing agents include methylene chloride, pentane, freon 11, perchlorethylene, azodicarbonamide, and 2,2'-azobis(2-methylpropionitrile). The blowing agents are preferably employed in amounts of about 1–15 wt. %, and more preferably 3–8% wt. %, based on the weight of the polymeric foam reactants.

Flame retardant additives may also be incorporated in this invention to render the resultant foams flame-retardant. Preferred additives include polyphosphoric acid and antimony trioxide but organic phosphate esters such as tris-3-chlorpropyl phosphate are also effective for this purpose. Flame-retardant additive amounts of from 1–10 wt. %, based on the weight of the polymeric foam reactants, generally provide satisfactory flame retardancy without adverse effect on the foam physical properties.

The flame retarded polymeric foams of this invention have the advantage of generating minimal toxic smoke, when exposed to an open flame. This compares favorably with flame-retarded polyurethane, which tends to emit toxic smoke under similar conditions.

Besides flame retardant additives, inert fillers may also be added to the foam composition to moderate the reaction, increase foam density, improve foam strength, or the like.

Polymeric foam compositions of this invention are characterized by having good color, being white to beige in color; having small, uniform closed cell structure; being relatively low in density; being resistant to thermal or high humidity-induced deterioration; being relatively non-corrosive when contacted with metals under high temperature, high humidity conditions; and being readily flame-retarded.

EXAMPLE I

A polymeric foam derived from polymaleic anhydride-ethylene glycol was prepared using the following formulation:

| component | weight, gm | weight percentage |
|---|---|---|
| polymaleic anhydride (avg. mol. wt. 3500) | 90 | 51 |
| ethylene glycol | 54 | 31 |
| 1,4-methylene diphenyl diisocyanate (avg. mol. wt. 6000) | 5 | 3 |
| polyphosphoric acid (115% $H_3PO_4$) | 10 | 6 |
| methylene chloride | 15 | 9 |

The polyphosphoric acid was included to render the resultant foam flame retardant. Methylene chloride served as the blowing agent. With the exception of the solid polymaleic anhydride, all of the other components were liquids.

The components described above were mechanically mixed, at room temperature, to form a stiff paste. This paste mixture was placed in an aluminum-lined baking pan and heated in an air oven to a temperature of 140° C. for 20 minutes.

The resultant foamed composition was removed and evaluated. The polymeric foam was characterized by having small, uniformly-sized, closed cells and an overall foam density of 3.3 lb/ft$^3$.

A 3 in cubed section was tested for resistance to water degradation by being placed in boiling water for 10 minutes. Upon removal, the foam was somewhat swollen but after drying at ambient temperature the foam regained its original shape and remained intact.

COMPARATIVE EXAMPLE A

In order to illustrate the role of the organic isocyanate in promoting hydrolytic stability in the polymeric foam, the procedure of Example 1 was repeated, using an analogous formulation that omitted the organic isocyanate as a component.

The foamed material that resulted after the paste mixture was heated at a temperature of 140° C. for 20 minutes was recovered and evaluated. The foamed material was characterized by having large, irregular shaped cells; its density was 3.2 lb/ft$^3$.

A 3 in cubed section of the foamed material was heated in boiling water, and within a five minute period, the foam disintegrated into a white powder.

EXAMPLES II–VI

In these Examples, the general procedure of Example I was repeated, except that heating of the component paste mixture at 140° C. was for a period of 1 hour rather than 20 minutes. Several different hydroxyl-containing compounds were utilized: 1,2-propanediol (Example II); 1,4-butanediol (III); p-xylene-α,α'-diol (IV); ethylene glycol (V); and glycerol (VI). Flame retardant additives were used in all the examples, polyphosphoric acid in Examples II and III and antimony trioxide in Examples IV–VI.

The components and amounts employed in each of the Examples II–VI are shown below.

The polymeric foams that were produced in these examples were similar to that of Example I: all had small, uniformly-sized closed cells. Foam densities for Examples II, V, VI were 4.5, 2.7 and 3.0 lb/ft$^3$, respectively.

EXAMPLE II

| component | weight, gm | weight percentage |
|---|---|---|
| polymaleic anhydride | 4.0 | 48 |
| 1,2-propanediol (propylene glycol) | 3.1 | 37 |
| 1,4-methylene diphenyl diisocyanate | 0.2 | 2 |
| polyphosphoric acid (115% $H_3PO_4$) | 0.4 | 5 |
| methylene chloride | 0.7 | 8 |

EXAMPLE III

| component | weight, gm | weight percentage |
|---|---|---|
| polymaleic anhydride | 6.0 | 45 |
| 1,4-butanediol | 5.4 | 41 |
| 1,4-methylene diphenyl diisocyanate | 0.4 | 3 |
| polyphosphoric acid (115% $H_3PO_4$) | 0.4 | 3 |
| methylene chloride | 1.1 | 8 |

EXAMPLE IV

| component | weight, gm | weight percentage |
|---|---|---|
| polymaleic anhydride | 9.0 | 42 |
| p-xylene-α,α'-diol | 9.1 | 42 |
| 1,4-methylene diphenyl diisocyanate | 0.65 | 3 |
| antimony trioxide | 1.0 | 5 |
| methylene chloride | 1.75 | 8 |

EXAMPLE V

| component | weight, gm | weight percentage |
|---|---|---|
| polymaleic anhydride | 120 | 52 |
| ethylene glycol | 72 | 31 |
| 1,4-methylene diphenyl diisocyanate | 7 | 3 |
| antimony trioxide | 13 | 6 |
| methylene chloride | 19 | 8 |

EXAMPLE VI

| component | weight, gm | weight percentage |
|---|---|---|
| polymaleic anhydride | 90.0 | 44 |
| glycerol | 88.5 | 44 |
| 1,4-methylene diphenyl diisocyanate | 3.9 | 2 |
| antimony trioxide | 10.0 | 5 |
| methylene chloride | 10.1 | 5 |

We claim:

1. A polymeric foam comprising the product of polymaleic anhydride reacted with a hydroxyl-containing compound selected from $C_2$–$C_{10}$ diols, $C_3$–$C_6$ triols, $C_4$–$C_5$ tetraols and their derivatives, in the presence of an organic isocyanate.

2. The composition of claim 1 wherein the polymaleic anhydride has an average molecular weight of from about 1500 to 5000.

3. The composition of claim 1 wherein the hydroxyl-containing compound is selected from the group consisting of $C_2$–$C_6$ alkyl, $C_4$–$C_6$ alkenyl and $C_6$ cycloalkyl diols.

4. The composition of claim 3 wherein the diol is selected from the group consisting of ethylene glycol, propylene glycol, butanediol, butenediol, cyclohexanediol, and xylenediol.

5. The composition of claim 1 wherein the triol is glycerol.

6. The composition of claim 1 wherein the diol derivative is polyethylene glycol.

7. The composition of claim 6 wherein the polyethylene glycol has an average molecular weight of from about 350 to 4500.

8. The composition of claim 1 wherein a portion of the hydroxyl groups in the hydroxyl-containing compound are epoxidized.

9. The composition of claim 8 wherein the partially epoxidized hydroxyl-containing compound is selected from the group consisting of glycidol and polyglycidol.

10. The composition of claim 1 wherein the polymaleic anhydride and hydroxyl-containing compound are reacted in molar ratios of from 0.75:1 to 2.5:1 polymaleic anhydride: hydroxyl-containing compound.

11. The composition of claim 1 wherein the polymaleic anhydride and hydroxyl-containing compound are reacted in molar ratios of from 0.9:1 to 1.5:1 polymaleic anhydride: hydroxyl-containing compound.

12. The composition of claim 1 wherein the organic isocyanate is present in an amount of from about 1–10 wt. %, based on the weight of the polymeric foam primary reactants.

13. The composition of claim 1 wherein the organic isocyanate is present in an amount of from about 2–6 wt. %, based on the weight of the polymeric foam primary reactants.

14. The composition of claim 1 wherein the organic isocyanate is a diisocyanate compound.

15. The composition of claim 1 wherein the organic isocyanate is selected from the group consisting of 1,4-methylene diphenyl diisocyanate, toluene diisocyanate, hexamethylene diisocyanate, m-phenylene diisocyanate, tolidine diisocyanate, 4,4'-dicyclohexylmethane diisocyanate, and polymeric diphenylmethane diisocyanate.

16. The composition of claim 1 wherein the polymeric foam contains from 1–10 wt. % of a flame retardant agent, based on the weight of the polymeric foam reactants.

17. The composition of claim 16 wherein the flame retardant agent is selected from the group consisting of polyphosphoric acid and antimony trioxide.

18. A process for preparing a polymeric foam which comprises reacting polymaleic anhydride with a hydroxyl-containing compound selected from $C_2$–$C_{10}$ diols, $C_3$–$C_6$ triols, $C_4$–$C_5$ tetraols and their derivatives, in the presence of an organic isocyanate.

19. The process of claim 18 wherein the polymaleic anhydride has an average molecular weight of from about 1500 to 5000.

20. The process of claim 18 wherein the hydroxyl-containing compound is selected from the group consisting of $C_2$–$C_6$ alkyl, $C_4$–$C_6$ alkenyl and $C_6$ cycloalkyl diols.

21. The process of claim 20 wherein the diol is selected from the group consisting of ethylene glycol, propylene glycol, butanediol, butenediol, cyclohexanediol, and xylenediol.

22. The process of claim 18 wherein the triol is glycerol.

23. The process of claim 18 wherein the diol derivative is polyethylene glycol.

24. The process of claim 23 wherein the polyethylene glycol has an average molecular weight of from about 350 to 4500.

25. The process of claim 18 wherein a portion of the hydroxyl groups in the hydroxyl-containing compound are epoxidized.

26. The process of claim 25 wherein the partially epoxidized hydroxyl-containing compound is selected from the group consisting of glycidol and polyglycidol.

27. The process of claim 18 wherein the polymaleic anhydride and hydroxyl-containing compound are reacted in molar ratios of from 0.75:1 to 2.5:1 polymaleic anhydride:hydroxyl-containing compound.

28. The process of claim 18 wherein the polymaleic anhydride and hydroxyl-containing compound are reacted in molar ratios of from 0.9:1 to 1.5:1 polymaleic anhydride:hydroxyl-containing compound.

29. The process of claim 18 wherein the organic isocyanate is present in an amount of from about 1–10 wt. %, based on the weight of the polymeric foam primary reactants.

30. The process of claim 18 wherein the organic isocyanate is present in an amount of from about 2–6 wt. %, based on the weight of the polymeric foam primary reactants.

31. The process of claim 18 wherein the organic isocyanate is a diisocyanate compound.

32. The process of claim 18 wherein the organic isocyanate is selected from the group consisting of 1,4-methylene diphenyl diisocyanate, toluene diisocyanate, hexamethylene diisocyanate, m-phenylene diisocyanate, tolidine diisocyanate, 4,4'-dicyclohexylmethane diisocyanate, and polymeric diphenylmethane diisocyanate.

33. The process of claim 18 which further comprises incorporating from 1–10 wt. % of a flame retardant agent, based on the weight of the foam reactants, into the polymeric foam.

34. The process of claim 33 wherein the flame retardant agent is selected from the group consisting of polyphosphoric acid and antimony trioxide.

35. The process of claim 18 which further comprises utilizing a blowing agent during preparation of the polymeric foam.

36. The process of claim 35 wherein the blowing agent is employed in amounts of from 1-15 wt. %, based on the weight of the foam reactants.

37. The process of claim 35 wherein the blowing agent is selected from the group consisting of pentane, perchlorethylene, trifluoro-monochloromethane, methylene chloride, azodicarbonamide, and 2,2'-azobis(2-methylpropionitrile).

38. The process of claim 18 wherein the reaction is effected at an elevated temperature, above 100° C.

39. The process of claim 18 wherein the reaction is effected at an elevated temperature, from 110° C. to 225° C.

40. The process of claim 25 wherein the reaction is effected at ambient temperature, about 10° to 30° C.

41. The process of claim 18 which further comprises effecting the reaction with an initiator or catalyst.

42. The process of claim 41 wherein the reaction is effected at ambient temperature, about 10° to 30° C.

43. The process of claim 18 which further comprises carrying out the reaction in a solvent.

44. The process of claim 18 wherein the solid polymaleic anhydride is introduced to a reactor containing the liquid hydroxyl-containing compound.

45. The process of claim 18 wherein the organic isocyanate is introduced after the reaction has been initiated.

46. The process of claim 18 wherein the reaction time is from 10 to 30 minutes.

* * * * *